(12) United States Patent
Kumar et al.

(10) Patent No.: US 10,965,428 B2
(45) Date of Patent: Mar. 30, 2021

(54) METHODS AND SYSTEMS FOR TRANSMISSION OF TCP ACK PACKETS

(71) Applicant: Samsung Electronics Co., Ltd., Suwon-si (KR)

(72) Inventors: Rohit Kumar, Bengaluru (IN); Tushar Vrind, Bengaluru (IN); Lalit Kumar Pathak, Bengaluru (IN)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 49 days.

(21) Appl. No.: 16/244,869

(22) Filed: Jan. 10, 2019

(65) Prior Publication Data

US 2020/0153594 A1   May 14, 2020

(30) Foreign Application Priority Data

Nov. 13, 2018 (IN) .............................. 201841042655

(51) Int. Cl.
| | |
|---|---|
| *H04L 5/00* | (2006.01) |
| *H04L 1/18* | (2006.01) |
| *H04B 17/336* | (2015.01) |
| *H04W 76/15* | (2018.01) |
| *H04L 1/20* | (2006.01) |

(52) U.S. Cl.
CPC ......... *H04L 5/0055* (2013.01); *H04B 17/336* (2015.01); *H04L 1/1829* (2013.01); *H04L 1/203* (2013.01); *H04W 76/15* (2018.02)

(58) Field of Classification Search
CPC ..... H04L 5/0055; H04L 1/1829; H04W 76/15
See application file for complete search history.

(56) References Cited

U.S. PATENT DOCUMENTS

| | | | | |
|---|---|---|---|---|
| 6,876,639 | B1 * | 4/2005 | Cao ...................... | H04L 1/1607 370/331 |
| 6,952,707 | B1 * | 10/2005 | Josten ................. | G06F 16/2308 707/704 |
| 8,953,519 | B2 * | 2/2015 | Bucknell ............... | H04L 69/324 370/328 |
| 10,623,980 | B1 * | 4/2020 | Patel ................... | H04L 49/9005 |
| 2006/0259844 | A1 * | 11/2006 | Kawada ................ | H04L 1/1877 714/748 |
| 2006/0262788 | A1 * | 11/2006 | Johnson ................. | H04L 69/22 370/389 |
| 2008/0089228 | A1 * | 4/2008 | Lin ........................ | H04L 47/14 370/230 |
| 2008/0285945 | A1 * | 11/2008 | Rajakarunanayake ..................... H04N 21/43622 386/235 |
| 2009/0080463 | A1 * | 3/2009 | Yang ..................... | H04L 47/193 370/476 |
| 2010/0074111 | A1 * | 3/2010 | Krishnaprasad ...... | H04L 69/163 370/231 |

(Continued)

*Primary Examiner* — Parth Patel
(74) *Attorney, Agent, or Firm* — Harness, Dickey & Pierce, P.L.C.

(57) ABSTRACT

Methods performed by a User Equipment (UE) are provided for transmission of one or more Transport Control Protocol (TCP) Acknowledgement (ACK) packets including reserving one or more Sequence Numbers (SNs) in at least one of a Packet Data Convergence Protocol (PDCP) SN space or a Radio Link Control (RLC) SN space, allocating the one or more reserved SNs, to the one or more TCP ACK packets, and sending the one or more TCP ACK packets.

20 Claims, 7 Drawing Sheets

(56) References Cited

U.S. PATENT DOCUMENTS

| | | | |
|---|---|---|---|
| 2011/0103311 A1* | 5/2011 | Navratil | H04L 1/1685 370/328 |
| 2011/0235630 A1* | 9/2011 | Hui | H04L 47/52 370/352 |
| 2013/0176988 A1* | 7/2013 | Wang | H04L 61/2007 370/331 |
| 2013/0250767 A1* | 9/2013 | Zhong | H04L 47/193 370/235 |
| 2014/0219112 A1* | 8/2014 | Kherani | H04W 72/1242 370/252 |
| 2015/0016367 A1* | 1/2015 | Koskinen | H04L 5/001 370/329 |
| 2015/0215436 A1* | 7/2015 | Kancherla | H04L 63/1458 709/219 |
| 2015/0296418 A1* | 10/2015 | Szilagyi | H04L 69/161 370/331 |
| 2016/0073449 A1* | 3/2016 | Pang | H04L 69/163 370/328 |
| 2016/0277957 A1* | 9/2016 | Patel | H04W 52/0229 |
| 2016/0344631 A1* | 11/2016 | Krishnamurthy | H04L 47/11 |
| 2017/0290005 A1* | 10/2017 | Lin | H04L 69/163 |
| 2017/0311168 A1* | 10/2017 | Khawer | H04W 16/14 |
| 2017/0373950 A1* | 12/2017 | Szilagyi | H04L 43/00 |
| 2018/0063854 A1* | 3/2018 | Kanamarlapudi | H04L 1/1887 |
| 2018/0077605 A1* | 3/2018 | Maheshwari | H04L 69/321 |
| 2018/0131640 A1* | 5/2018 | Kanamarlapudi | H04L 1/1621 |
| 2018/0132128 A1* | 5/2018 | Koskinen | H04L 1/1832 |
| 2018/0132263 A1* | 5/2018 | Nuggehalli | H04W 72/10 |
| 2018/0176816 A1* | 6/2018 | Meylan | H04L 47/2408 |
| 2018/0199229 A1* | 7/2018 | Lee | H04W 76/14 |
| 2018/0205502 A1* | 7/2018 | Merlin | H04L 61/6022 |
| 2018/0262951 A1* | 9/2018 | Jiang | H04L 47/34 |
| 2018/0316480 A1* | 11/2018 | Ohta | H04L 1/0003 |
| 2018/0376374 A1* | 12/2018 | Trainin | H04L 1/0026 |
| 2019/0044878 A1* | 2/2019 | Steffen | H04L 47/34 |
| 2019/0081688 A1* | 3/2019 | Deenoo | H04L 5/0069 |
| 2019/0387577 A1* | 12/2019 | Parron | H04L 47/2466 |
| 2020/0084664 A1* | 3/2020 | Wu | H04W 28/06 |
| 2020/0107223 A1* | 4/2020 | Liu | H04W 28/065 |
| 2020/0153594 A1* | 5/2020 | Kumar | H04L 1/1829 |
| 2020/0169914 A1* | 5/2020 | Govil | H04W 28/0294 |

* cited by examiner

FIG. 2

| PDCP SN | 0 | 1 | 2 | 3 | 4 | 5 | 6 | 7 | 8 | 9 | 10 | 11 | 12 | ... | 101 | 102 | 103 | 104 | 105 | ... |
|---|---|---|---|---|---|---|---|---|---|---|---|---|---|---|---|---|---|---|---|---|
| | Data_Pkt | Data_Pkt | Data_Pkt | Data_Pkt | Data_Pkt | Reserved for TCP ACK | Data_Pkt | Data_Pkt | Data_Pkt | Data_Pkt | Data_Pkt | Reserved for TCP ACK | Data_Pkt | ... | Data_Pkt | Data_Pkt | Data_Pkt | Data_Pkt | Reserved for TCP ACK | ... |

| PDCP SN | 0 | 1 | 2 | 3 | 4 | 5 | 6 | 7 | 8 | 9 | 10 | 11 | 12 | ... | 101 | 102 | 103 | 104 | 105 | ... |
|---|---|---|---|---|---|---|---|---|---|---|---|---|---|---|---|---|---|---|---|---|
| | Data_Pkt | Data_Pkt | Data_Pkt | Data_Pkt | Data_Pkt | Reserved for TCP ACK | Data_Pkt | Data_Pkt | Data_Pkt | Data_Pkt | Data_Pkt | Reserved for TCP ACK | Data_Pkt | ... | Data_Pkt | Data_Pkt | Data_Pkt | Data_Pkt | Reserved for TCP ACK | ... |

FIG. 4A

PDCP SN Space
| 0 | 1 | 2 | 3 | 4 | ... | 1024 | 1025 | ... | 4079 | 4080 | 4081 | 4082 | ... | 4095 |

PDCP SN Space Part 1
| 0 | 1 | 2 | 3 | 4 | ... | 1024 | 1025 | ... | 4079 |

PDCP SN Space Part 2
| 4080 | 4081 | 4082 | ... | 4095 |

FIG. 4B

PDCP SN Space: | 0 | 1 | 2 | 3 | 4 | ... | 1024 | 1025 | ... | 4079 | 4080 | 4081 | 4082 | ... | 4095 |

PDCP SN Space Part 1: | 0 | 1 | 2 | 3 | 4 | ... | 1024 | 1025 | ... | 4079 |

PDCP SN Space Part 2: | 4080 | 4081 | 4082 | ... | 4095 |

RLC SN Space: | 0 | 1 | 2 | 3 | 4 | ... | 1024 | 1025 | ... | 4079 | 4080 | 4081 | 4082 | ... | 4095 |

RLC SN Space Part 1: | 0 | 1 | 2 | 3 | 4 | ... | 1024 | 1025 | ... | 4079 |

RLC SN Space Part 2: | 4080 | 4081 | 4082 | ... | 4095 |

METHODS AND SYSTEMS FOR TRANSMISSION OF TCP ACK PACKETS

CROSS-REFERENCE TO RELATED APPLICATIONS

This application claims priority under 35 U.S.C. 119 to Indian Patent Application No. 201841042655, filed Nov. 13, 2018, the entire contents of which are hereby incorporated by reference.

TECHNICAL FIELD

Some example embodiments herein relate to transmission of Transport Control Protocol (TCP) Acknowledgement (ACK) packets, and more particularly to methods and systems for prioritizing transmission of TCP ACK packets and increasing reliability of the transmission of the TCP ACK packets.

BACKGROUND

Packets received by a Communication Processor (CP) are allocated Packet Data Convergence Protocol (PDCP) and Radio Link Control (RLC) Sequence Numbers (SN) in a sequential manner. According to Transport Control Protocol (TCP), an ACK packet is sent to ensure successful delivery of a single packet and or plurality of packets. For example, a User Equipment (UE) that receives a specific packet from a server (e.g., an Evolved Node B (eNB)/Next Generation Node B (gNB)) transmits a TCP ACK packet to the server to confirm receipt of the packet. The server re-transmits the specific packet to the UE if the server does not receive a TCP ACK packet within a counter timeout period.

SUMMARY

Some example embodiments provide a method performed by a User Equipment (UE) for transmission of one or more Transport Control Protocol (TCP) Acknowledgement (ACK) packets. The method includes reserving one or more Sequence Numbers (SNs) in at least one of a Packet Data Convergence Protocol (PDCP) SN space or a Radio Link Control (RLC) SN space, allocating the one or more reserved SNs, to the one or more TCP ACK packets, and sending the one or more TCP ACK packets.

Some example embodiments provide a method performed by a User Equipment (UE) for transmission of one or more Transport Control Protocol (TCP) Acknowledgement (ACK) packets of a bearer service. The method includes ordering the one or more TCP ACK packets in a first queue and one or more non-TCP ACK packets of the bearer service in a second queue, the first queue having a higher priority than the second queue, and allocating a plurality of Sequence Numbers (SN) in at least one of a Packet Data Convergence Protocol (PDCP) SN space or a Radio Link Control (RLC) SN space to the one or more TCP ACK packets and the one or more non-TCP ACK packets based on the priority of the first queue and the priority of the second queue.

Some example embodiments provide a method performed by a User Equipment (UE) for transmission of one or more Transport Control Protocol (TCP) Acknowledgement (ACK) packets of a plurality of bearer services. The method includes calculating a priority of a TCP ACK queue based on an average of a plurality of determined priorities of a plurality of individual queues, the TCP ACK queue including the one or more TCP ACK packets, each of the plurality of individual queues including one or more uplink data packets of one of the plurality of bearer services and having a determined priority of the plurality of determined priorities, and allocating uplink grant resources for transmission of the one or more TCP ACK packets based on the calculated priority of the TCP ACK queue and the plurality of determined priorities of the plurality of individual queues.

Some example embodiments provide a method performed by a User Equipment (UE) for transmission of one or more Transport Control Protocol (TCP) Acknowledgement (ACK) packets of a plurality of bearer services. The method includes calculating a priority of a TCP ACK queue based on a number of the one or more TCP ACK packets in a plurality of individual queues and a plurality of determined priorities of the plurality of individual queues, the TCP ACK queue including the one or more TCP ACK packets, each of the plurality of individual queues including one or more uplink data packets of one of the plurality of bearer services and having a determined priority of the plurality of determined priorities, and allocating uplink grant resources for transmission of the one or more TCP ACK packets based on the calculated priority of the TCP ACK queue and the plurality of determined priorities of the plurality of individual queues.

Some example embodiments provide a method performed by a User Equipment (UE) for transmission of Transport Control Protocol (TCP) Acknowledgement (ACK) packets. The method includes transmitting the one or more TCP ACK packets through at least one of NSA (Non Standalone) NR (New Radio) including a License Assisted Access (LAA) link, a Device to Device (D2D) peer, a first carrier of a first plurality of carriers for which a grant is available for at least one of Carrier Aggregation (CA) or Dual Connectivity (DC), the first carrier having a lowest Block Error Rate (BLER) of the first plurality of carriers and a highest Signal to Interference and Noise Ratio (SINR) of the first plurality of carriers, a second carrier of a second plurality of carriers for which the grant is available, the second carrier having a highest Power Headroom (PH) of the second plurality of carriers, or a primary carrier and a secondary carrier for NSA NR.

Some example embodiments provide a User Equipment (UE) for transmission of one or more Transport Control Protocol (TCP) Acknowledgement (ACK) packets. The UE includes a memory storing computer-readable instructions, and at least one processor coupled to the memory and configured to execute the computer-readable instructions to reserve one or more SNs in at least one of a Packet Data Convergence Protocol (PDCP) SN space or a Radio Link Control (RLC) SN space, allocate the one or more reserved SNs to the one or more TCP ACK packets, and send the one or more TCP ACK packets.

These and other aspects of some example embodiments herein will be better appreciated and understood when considered in conjunction with the following description and the accompanying drawings. It should be understood, however, that the following descriptions, while indicating some example embodiments and numerous specific details thereof, are given by way of illustration and not of limitation. Many changes and modifications may be made within the scope of some example embodiments without departing from the spirit thereof, and some example embodiments include all such modifications.

BRIEF DESCRIPTION OF FIGURES

Some example embodiments are illustrated in the accompanying drawings, throughout which like reference letters indicate corresponding parts in the various figures. Some example embodiments herein will be better understood from the following description with reference to the drawings, in which:

FIG. 2 depicts a PDCP SN space and a RLC SN space in which SNs are reserved, according to some example embodiments as disclosed herein;

FIG. 4a depicts segmentation of the PDCP SN space for separate allocation of SNs to TCP ACK packets and uplink data packets in a $4^{th}$ Generation (4G) Long-Term Evolution (LTE) network, according to some example embodiments as disclosed herein;

FIG. 4b depicts segmentation of the PDCP SN space and the RLC SN space for separate allocation of SNs to the TCP ACK packets and the uplink data packets in a $5^{th}$ Generation (5G) LTE network, according to some example embodiments as disclosed herein;

DETAILED DESCRIPTION

Figure 1A:
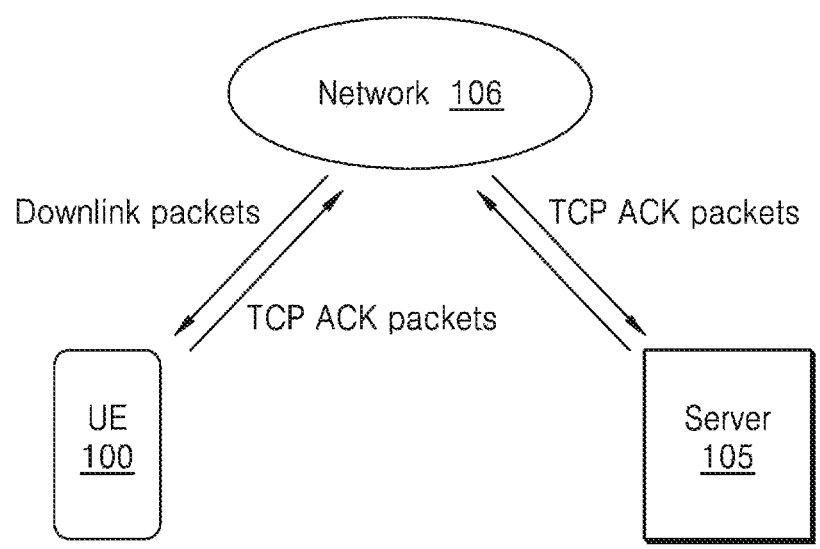
FIG. 1a depicts a system comprising of a User Equipment (UE) and a server exchanging data packets through a network, according to embodiments as disclosed herein.

Some example embodiments herein and the various features and advantageous details thereof are explained more fully with reference to some non-limiting example embodiments that are illustrated in the accompanying drawings and detailed in the following description. Descriptions of well-known components and processing techniques are omitted herein so as to not unnecessarily obscure some example embodiments. The examples used herein are intended merely to facilitate an understanding of ways in which some example embodiments may be practiced and to further enable those of skill in the art to practice the same. Accordingly, the examples should not be construed as limiting the scope of some example embodiments.

The various operations of methods described above may be performed by any suitable means capable of performing the operations, such as various hardware and/or software implemented in some form of hardware (e.g., processor, ASIC, etc.).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or operations of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Some example embodiments herein disclose methods and systems for prioritization and reliable transmission of TCP ACK packets.

Some example embodiments provide reserving SNs in at least one of PDCP SN space and RLC SN space for allocating the reserved SNs to the TCP ACK packets.

Some example embodiments provide preparing, at time T, the PDCP and RLC packets, e.g., assigning/mapping PDCP/RLC SN to the TCP packets in advance, which is sufficient to support the transmissions of a next 'X' Transmission Time Interval (TTI), e.g. up to 'T+X' TTI, even though uplink TCP packets are available at CP, hereby allowing additional time, e.g., 'X−Y' TTI, for future TCP ACK packets to be allocated subsequent SNs prior to allocating SNs to the pending uplink TCP packets (non TCP ACK packets) in uplink buffer, where Y is greater or equal to zero, which depends on the CP and hardware capability.

Some example embodiments provide segmenting the at least one of the PDCP SN space and the RLC SN space, in which one part of the SNs are allocated to the TCP ACK packets and the second part of the SNs are allocated to the rest of TCP (e.g., non TCP ACK) packets.

Some example embodiments provide utilizing multiple queues, configured with different priorities, for allocating SNs in the at least one of the PDCP SN space and the RLC SN space to the TCP ACK packets and the other uplink TCP packets separately, wherein the priority of the queues will be dependent on the priority of the corresponding logical channel identity for which these TCP ACK packets belong to.

Some example embodiments provide utilizing a dedicated queue for TCP ACK packets of configured services, and logical channel priority of the queue may be computed using rules by a multiplexer and an assembler while handling a grant.

Some example embodiments provide using a link quality metric of the multiple available links to select a reliable link for TCP ACK packet transmission. Using cross layer information exchange about the link quality, Media Access Control (MAC) or concerned module uses this information while handling a grant to create an Uplink Transport Block (TB), where TCP ACK packet will be mapped to a better link.

Some example embodiments include reserving a defined number of SNs in at least one of a PDCP SN space and a RLC SN space. The defined number of reserved SNs may be allocated to the TCP ACK packets for transmission of the TCP ACK packets. If SNs are reserved in the at least one of the PDCP SN space and the RLC SN space, then the TCP ACK packets may be allocated SNs in at least one of the PDCP SN space and RLC SN space, which may enable faster transmission of the TCP ACK packets compared to the non TCP ACK packets.

In an example, consider that SNs at the start of the at least one of the PDCP SN space and the RLC SN space are reserved for allocating to the TCP ACK packets. When the uplink data rate is equal to, or greater than downlink data rate, the TCP ACK packets may be transmitted with low delay, despite the presence of uplink data packets in the uplink buffer; because the SNs allocated to the TCP ACK packets are located at the start of the at least one of the PDCP SN space and the RLC SN space. The uplink packets allocated with SNs at the start of the at least one of the PDCP SN space and RLC SN space may be transmitted earlier than uplink packets allocated with SNs located later in the at least one of the PDCP SN space and the RLC SN space.

Some example embodiments include preparing in advance at least one of the PDCP and RLC packets, sufficient to support the transmissions of the next several TTI only, even though more uplink packets are available at the CP. This may allow more time for possible reception of future TCP ACK packets at the CP. The future TCP ACK packets may be allocated to next/subsequent SNs, prior to allocating SNs to the uplink TCP packets pending in uplink buffer. Once the prepared packets count reaches a defined threshold, the packet creation process may start for subsequent several TTI transmissions.

Some example embodiments include segmenting of at least one of the PDCP SN space and the RLC SN space into a first region and a second region; wherein the first region is used for allocating SNs to the TCP ACK packets and the second region is used for allocating SNs to the other TCP packets, wherein the TCP ACK packets and the other TCP packets are allocated SNs sequentially in their respective region.

Some example embodiments include configuring different queues for storing (also referred to herein as "ordering") the TCP ACK packets and the other TCP packets, of each bearer service. Thus for each bearer, two separate queues are maintained to store TCP ACK and non TCP ACK packets, respectively. For each bearer, the queue storing the TCP ACK packets will have higher priority in comparison with the queue storing the non TCP packets; but lower priority in comparison with the queues of another bearer configured with higher logical channel priority. The priorities of the queues storing the TCP ACK packets and the non-TCP packets for each of the bearers will be used by a multiplexer and an assembler while dividing the grant across different bearer or logical channels; wherein the multiplexer and assembler is a module or submodule of MAC layer of a radio access technology (RAT) and is located primarily in MAC sublayer. It may be a hardware (H/W) and/or software (S/W) implementation. Therefore, for each bearer, scheduling of TCP ACK packets will be prioritized before the non TCP ACK packet of that bearer.

Some example embodiments include configuring a single queue for storing the TCP ACK packets of all bearers, wherein each bearer may provide a different Quality of Service (QoS). This queue, which is storing the TCP ACK packets of all the bearers, can be referred to as a TCP ACK queue. The embodiments include computing the priority of the TCP ACK queue. Some example embodiments provide methods for setting priorities to the TCP ACK packets, belonging to the different bearers, in the single queue. The computed priority will be used by the multiplexer and an assembler while dividing the grant across different bearer or logical channels.

In an example, consider that there are three active Data Radio Bearers (DRBs), including a first DRB of identity 3, a second DRB of identity 4, and a third DRB of identity 5. Each DRB includes an individual queue. The non-TCP ACK packets in each DRB can be stored in its respective individual queues. The priorities of the individual queues of the first, second and third DRBs may be 4, 5, and 6 respectively. Thus, each of the DRBs can have a predetermined priority assigned to their respective individual queues. Therefore, it may be assumed, without loss of generality, that the third DRB has the highest priority. The TCP ACK packets belonging to the first, second and third DRBs, together, may be included in a special queue (TCP ACK queue).

In some example embodiments, the TCP ACK queue may be configured with a priority greater than 6.

In some example embodiments, the priority of the TCP ACK queue may be set by averaging the priorities of the individual queues of the first, second and third DRBs. In the present example, the priority of the TCP ACK queue is (4+5+6)/3=5. In the case of equal priorities (as in this example, the priority of the queue of the second DRB is equal to the priority of the TCP ACK queue), a User Equipment (UE) may either consider the priority of the TCP ACK queue as higher compared to the queue of the second DRB or the priority of the TCP ACK queue may be considered as lower compared to the queue of the second DRB.

Continuing with the above example, consider that the individual queues of the first, second and third DRBs include 2, 5 and 7 TCP ACK packets, respectively. In some example embodiments, the priority of the TCP ACK queue may be set by calculating the sum of products of the number of packets of each of the individual queues and the priority of the respective independent queue, and dividing the result by the total number of packets in all independent queues. In the present example, the priority of the TCP ACK queue is (2*4+5*5+7*6)/2+5+7=5.35. Thus, the priority of the TCP ACK queue will be lower than that of the queue of the third DRB, but higher than that of the queue of the second DRB.

If the queue of the first DRB includes 2 TCP ACK packets, the queue of the second DRB includes 5 TCP packets and the queue of the third DRB includes 0 TCP ACK packets; then the priority of the TCP ACK queue may be set as 2*4+5*5/2+5=4.7. Thus, the priority of the TCP ACK queue will be lower than that of the queue of the second DRB, but higher than that of the queue of the first DRB.

Some example embodiments include ensuring reliability in transmission of the TCP ACK packets in a wireless medium. For NSA (Non Standalone) NR (New Radio) when one of the links is License Assisted Access (LAA), then the reliability may be ensured by transmitting the TCP ACK packets using the licensed link. The reliability may be ensured by transmitting the TCP ACK packets through a Device to Device (D2D) peer (Relay UE) link if the peer has a reliable link with the network. For Carrier Aggregation (CA) and Dual Connectivity (DC), if grant is available for multiple carriers, then the reliability may be ensured by transmitting the TCP ACK packet on the carrier with the lowest Block Error Rate (BLER) and highest Signal to Interference and Noise Ratio (SINR). If grant is available for multiple carriers, then the reliability may be ensured by transmitting the TCP ACK packet on the carrier having the best computed Power Headroom (PH).

Some example embodiments include mapping the TCP ACK packets on both a primary carrier and a secondary carrier for NSA NR. As the TCP ACK packets are relatively small in size, mapping the TCP ACK packets in both the carriers provides may ensure reliability and faster transmission of the TCP ACK packets.

Referring now to the drawings, and more particularly to FIG. 1a through 7, where similar reference characters denote corresponding features consistently throughout the figures, there are shown some example embodiments.

FIG. 1a depicts a system comprising of a UE 100 and a server 105 exchanging data packets through a network 106, according to embodiments as disclosed herein. As depicted in FIG. 1a, the UE 100 can receive downlink packets from the server 105. The UE 100 can transmit TCP ACK packets to the server 105 in order to confirm that the downlink packets have been successfully received. This ensures reliability of packet transmission by TCP. The UE 100 can transmit uplink packets to the server 105.

For each received downlink packet, a TCP ACK packet can be created in stored in uplink buffer of the UE 100. If the uplink buffer includes uplink data packets and the downlink data rate is high, the load of the network 106 is high and/or the network 106 is congested, and so on; then there can be delay in the transmission of the TCP ACK packets. If the server 105 experiences a timeout, i.e., it does not receive a TCP ACK packet corresponding a packet sent to the UE 100 within a predefined time, then the server 105 can retransmit the packet. This can compound the delay in transmitting the TCP ACK packet by the UE 100.

In order to prevent this scenario, the embodiments include reserving a portion of PDCP and/or RLC SN space, which can be used for allocating SNs to the TCP ACK packets, such that the TCP ACK packets can be transmitted quickly.

Figure 1B:
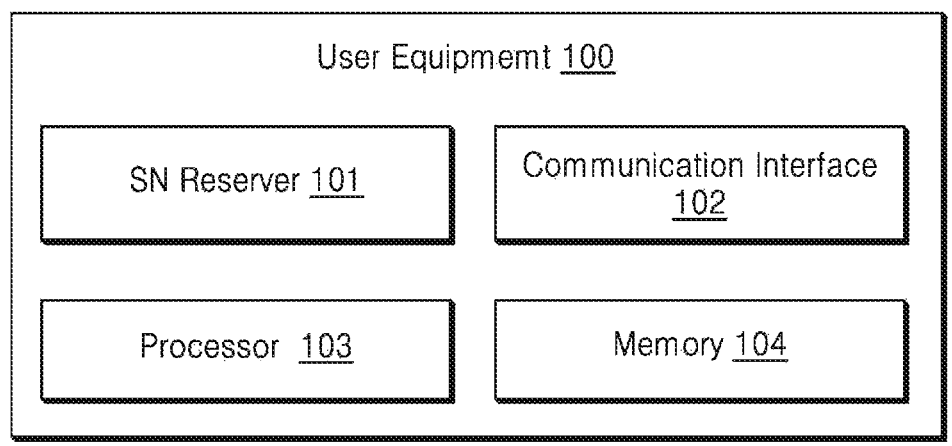
FIG. 1b is a block diagram of the UE for transmission of TCP ACK packets, according to some example embodiments as disclosed herein.

FIG. 1b depicts various components of the UE 100 for transmission of TCP ACK packets, according to some example embodiments as disclosed herein. As depicted in FIG. 1b, the UE 100 may include a SN reserver 101 a communication interface 102, a processing unit 103, and a memory unit 104. The SN reserver 101 may reserve SNs in at least one of a PDCP SN space and a RLC SN space. For example, reserving the SNs may involve designating the SNs to be allocated to one of a TCP ACK packet or an uplink data packet. If the uplink data rate and downlink data rate of the UE 100 are similar or the same, then an uplink buffer of the UE 100 may include both uplink data packets and TCP ACK packets. The UE 100 may transmit the TCP ACK packets in order to acknowledge successful reception of downlink data packets. In order to transmit uplink packets (as referred to herein, uplink packets may include uplink data packets and TCP ACK packets) in the uplink buffer, the UE 100 may allocate at least one PDCP SN and/or RLC SN to each of the uplink packets in the uplink buffer of the UE 100. According to some example embodiments, operations described herein as being performed by any or all of the UE 100 and the SN reserver 101 may be performed by at least one processor executing program code that includes instructions corresponding to the operations. The instructions may be stored in a memory of the UE 100. The term 'processor,' as used in the present disclosure, may refer to, for example, a hardware-implemented data processing device having circuitry that is physically structured to execute desired operations including, for example, operations represented as code and/or instructions included in a program. In some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and a field programmable gate array (FPGA). The communication interface 102 may be embodied, for example, by circuits or circuitry or, alternatively, at least one processor executing program code including instructions corresponding to any or all operations described herein as being performed by the communication interface 102.

The SN reserver 101 may allocate at least one of a PDCP SN and a RLC SN to an uplink packet (TCP ACK packet or a uplink packet) as it arrives in the uplink buffer. In conventional UEs, consider that the uplink buffer includes uplink data packets. The TCP ACK packets which arrive after the uplink data packets are allocated higher SN numbers in the at least the PDCP SN space and the RLC SN space compared to the SN numbers of the uplink data packets. This causes delay in transmission of the TCP ACK packets, as the TCP ACK packets are transmitted only after the uplink data packets have been transmitted.

However, according to some example embodiments, the SN reserver 101 may reserve SNs in the at least one of the PDCP SN space and the RLC SN space which may be allocated to the TCP ACK packets. The reserved SNs may be located at the start of the PDCP SN space and/or the RLC SN space. The TCP ACK packets allocated SNs at the start of the PDCP SN space and/or the RLC SN space may be transmitted prior to uplink data packets as the uplink data packets are allocated with SNs located later in the PDCP SN space and/or the RLC SN space in comparison with the SNs allocated to the TCP ACK packets. The TCP ACK packets may be transmitted prior to the uplink data packets even if the uplink data packets arrive in the uplink buffer prior to arrival of the TCP ACK packets.

Considering a scenario wherein a conventional User Equipment (UE) is connected to a server through an Evolved Node B (eNB)/Next Generation Node B (gNB). The uplink data rate of the UE may be equal to, if not more than, the downlink data rate of the UE. As such, the uplink buffer space in the conventional UE is likely to be occupied (or even exhausted) by uplink data packets. In such conditions, TCP ACK packets, which indicate successful reception of downlink packets, arriving in the uplink buffer may be allocated later SNs in PDCP and/or RLC SN space. The TCP ACK packets, with the later SNs, are transmitted only after transmission of the uplink data packets, which may be allocated starting SNs in the PDCP and/or the RLC SN space. There may also be a shortage of uplink buffer space for accommodating the TCP ACK packets. In the above mentioned scenarios, delivery of the ACK packets to the server is likely to be delayed.

The server includes a counter for tracking the TCP ACK packets corresponding to transmitted data packets. If the TCP ACK packets are not received prior to a counter timeout, the server re-transmits the data packets corresponding to the unreceived TCP ACK packets, resulting in excessive consumption of bandwidth. Further, the uplink buffer space is likely to be contested by the uplink data packets and the fresh TCP ACK packets corresponding to the retransmitted packets from the server. This may lead to further delay in transmission of TCP ACK packets. However, by reserving SNs at the start of the PDCP SN space and/or the RLC SN space for use in transmitting TCP ACK packets to the server before transmitting uplink data packets, the UE 100 provides a solution to the above described challenges of conventional UEs resulting in reduced delay in the transmission of TCP ACK packets.

In some example embodiments, SNs may be reserved at a static or dynamic rate in the PDCP SN space and/or the RLC SN space. If the rate of reservation is static, then the number of SNs reserved in the PDCP SN space and/or the RLC SN space remains constant. The rate of reservation of SNs may be varied (dynamic) based on number of TCP ACK packets in the uplink buffer, downlink data rate, uplink data rate, and so on.

In some example embodiments, a portion of the PDCP SN space and/or the RLC SN space may be utilized for reserving SNs, to be allocated to the TCP ACK packets, wherein a defined number of SNs at the start of the portion of the PDCP SN space and/or the RLC SN space may be reserved.

In some example embodiments, the PDCP SN space and/or the RLC SN space may be segmented into parts, in which a part of the PDCP SN space and/or the RLC SN space may be utilized for allocating SNs to the TCP ACK packets and another part of the PDCP SN space and/or the RLC SN space may be utilized for allocating SNs to the uplink data packets.

The communication interface 102 may transmit the TCP ACK packets and the uplink data packets, which are allocated with SNs in at least one of the PDCP SN space and the RLC SN space, to an Evolved Node B (eNB)/Next Generation Node B (gNB).

The processing unit 103 can be responsible for processing the allocation of the reserved SNs, in the PDCP SN space and/or the RLC SN space, to the TCP ACK packets. The processing unit 103 can determine whether the reserved SNs are unutilized. The processing unit 103 can determine the uplink Block Error Rate (BLER), Bit Error Rate (BER), signal quality, network load, and so on, for determining whether the number of SNs to be reserved, for allocating to the TCP ACK packets needs to kept constant, increased, or decreased.

The memory unit 104 can include the uplink buffer and downlink buffer. The uplink buffer can include uplink packets, which constitute the TCP ACK packets and the uplink data packets. The downlink buffer can include the downlink packets received from the server 105.

FIG. 1b is a block diagram of the UE 100, but it is to be understood that some example embodiments are not limited thereon. In some example embodiments, the UE 100 may include fewer or more components. Further, the labels or names of the components are used only for illustrative purposes and do not limit the scope of some example embodiments. One or more components may be combined together to perform the same or a substantially similar function in the UE 100.

FIG. 2 depicts a PDCP SN space and a RLC SN space in which SNs are reserved, according to some example embodiments as disclosed herein. In some example embodiments, a defined number of SNs may be reserved for allocating to the TCP ACK packets. For example, referring to FIG. 2, SN numbers 5, 11, 105, etc. in the PDCP SN space and the RLC SN space may be reserved for allocating to the TCP ACK packets. The remaining SN numbers in the PDCP SN space and the RLC SN space may be unreserved SNs and may be allocated to data packets. The portion of reserved SNs may be at least one of static and dynamic. If the defined number of reserved SNs is static, then the reserved SNs may be located periodically in at least one of the PDCP SN space and the RLC SN space. Each reserved SN may be, therefore, located between a fixed number of unreserved SNs in the at least one of the PDCP SN space and the RLC SN space. If the defined number of SNs is static, then the unreserved SNs, between the reserved SNs remains constant. If the rate of reserving SNs is dynamic, then the defined number of SNs, which are reserved for allocating to the TCP ACK packets, may vary. The defined number of unreserved SNs, between each of the reserved SNs, may also vary. The variation of the rate of reservation may be based on variation in the uplink data rate, the downlink data rate, a Block Error Rate (BLER), a Bit Error Rate (BER), a signal quality, a network load, or a number of unutilized SNs among the defined number of reserved SNs.

If the downlink data rates vary then the number of TCP ACK packets in uplink buffer may also vary. If the downlink data rate increases, then the number of SNs to be reserved in the SN space may be increased, as the number of TCK ACKs packets to be sent for acknowledging the received downlink packets increases. Thus the defined number of unreserved SNs, between the reserved SNs, may be correspondingly decreased. On the other hand, if the downlink data rate decreases, then the number of SNs to be reserved in the SN space may be decreased. Thus the defined number of unreserved SNs, between the reserved SNs, may be correspondingly increased.

If the BLER and/or BER is high, then the number of SNs to be reserved in the SN space needs to be increased; as the same downlink packet might be received multiple times. If the signal quality is poor and the network load is high, then the number of SNs to be reserved in the SN space needs to be increased. In such situations, the redundancy of a downlink packet may increase. In case the reserved SN space is unutilized, then the number of reserved SNs can be decreased.

If the reserved SNs in the PDCP/RLC space are not used for allocating to the TCP ACK packets, then those unutilized reserved SNs may be utilized for transmitting a PDCP data header packet, and subsequently forming a RLC packet for the reserved SN. In some example embodiments, respective a PDCP Packet Data Unit (PDU) may be formed using the previous or next PDCP Service Data Unit (SDU) in-sequence. Subsequently a RLC packet may be formed from the generated PDCP PDU. The unutilized reserved SNs may be allocated to at least one of a previous PDCP SDU, a subsequent PDCP SDU, or a PDCP SDU header. Accordingly, PDCP re-ordering in the dual-connectivity scenario is avoided and/or the PDCP/RLC re-establishment operation is handled. Otherwise, PDCP and/or RLC PDUs for the unutilized SNs may not be transmitted, and the next packet in sequence may be transmitted. Further, the defined number of reserved SNs in the at least one of the PDCP SN space and the RLC SN space may be decreased, if the reserved SNs are not used for allocating to TCP ACK packets.

Figure 3:
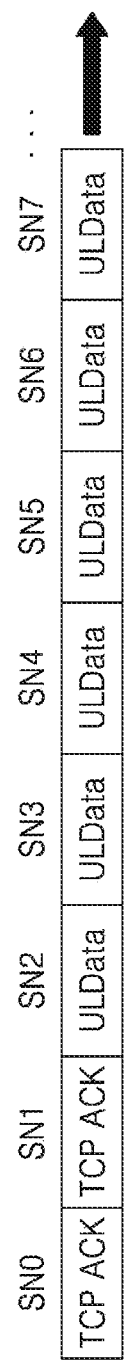
FIG. 3 depicts a portion of the PDCP SN space and/or the RLC SN space in which SNs at the start of the portion are reserved for TCP ACK packets, according to some example embodiments as disclosed herein.

FIG. 3 depicts a portion of the PDCP SN space and/or the RLC SN space in which SNs at the start of the portion are reserved for TCP ACK packets, according to some example embodiments as disclosed herein. Referring to FIG. 3, an example portion of the PDCP SN space and/or the RLC SN space is shown in which the start of the portion is reserved for TCP ACK SNs. Specifically, SNs 0 and 1 are reserved for TCP ACKs and SNs 2-7 are reserved for other uplink data. Some example embodiments include computing a defined number of uplink packets, which may be transmitted in a defined time period. The defined number of uplink packets are allocated SNs in the PDCP SN space and/or the RLC SN space. Therefore, a portion of the PDCP SN space and/or the RLC SN space may be utilized for allocating SNs to the defined number of uplink packets, even if there are uplink data packets waiting for SN allocation. The defined number of uplink packets and the defined time period are computed based on one or more of modem hardware, software capability, uplink grant rate, signal condition, network load, carrier aggregation (CA) behavior and other factors.

Some example embodiments further include selecting a subsequent defined portion of the PDCP SN space and/or the RLC SN space for transmitting a defined number of subsequent uplink packets. The selection may be performed when a portion of the defined number of uplink packets have been transmitted. The selection is performed in order to maintain or enhance the uplink data rate, such that less time is used for allocating SNs (or formation of PDCP/RLC PDU) to the subsequent uplink data packets or subsequent TCP ACK packets once uplink grant has been received.

In an example, consider that there are 500 uplink packets in which 10 are TCP ACK packets. Also, consider that 150 uplink packets (packet number 1 to 150) may be transmitted in a period of 30 ms (1 ms to 30 ms). The defined number of uplink packets, herein, to be allocated SNs in the PDCP SN space and/or the RLC SN space is 150. Some example embodiments include selecting a portion of the PDCP SN space and/or the RLC SN space (say, SN 11 to SN 160) which may be utilized for allocating SNs to the 150 uplink packets. Considering that if each uplink packet is allocated a SN, then 150 SNs will be utilized. Some example embodiments include allocating SNs to the TCP ACK packets at the start of the PDCP SN space and/or the RLC SN space, if available. For example, the SNs starting from SN 11 to SN 20 may be allocated to the 10 TCP ACK packets. The uplink data packets (other than the TCP ACK packets) are allocated SNs in the range of SN 21-160. Therefore, the portion of the PDCP SN space and/or RLC SN space utilized for allocating SNs to the 150 uplink packets is SN 11 to SN 160, wherein SN 11 to SN 20 are reserved for allocating to TCP ACK packets and SN 21 to SN 160 are used for allocating to uplink data packets (other than the TCP ACK packets).

Further, some example embodiments include selecting a subsequent portion of the PDCP SN space and/or the RLC SN space (SN 161 to SN 310) to allocate a subsequent 150 uplink packets (packet number 151 to 300), which may be transmitted in the subsequent 30 ms (31 ms to 60 ms). The selection may be performed once 120 uplink packets (packet number 11 to 130) have been transmitted. While the selection is performed, further SNs may be allocated to TCP ACK packets at the start of the subsequent portion of the PDCP SN space and/or the RLC SN space.

FIG. 4 depicts segmentation of the PDCP SN space for separate allocation of SNs to the TCP ACK packets and the uplink data packets in a 4G network, according to some example embodiments as disclosed herein. The uplink packets constitute uplink data packets and TCP ACK packets. In some example embodiments, the PDCP SN space is segmented into parts, including part 1 and part 2. Each part of the PDCP SN space may include a defined number of SNs. The part 2 may be used for allocating SNs exclusively to TCP ACK packets. The part 1 of the PDCP SN space, which includes a defined number of SNs, may be used for allocating SNs to the uplink data packets.

In a 4G network, RLC packets may be created after receiving an uplink grant. Therefore, while the RLC packets are created, the TCP ACK packets, in part 2 of the PDCP SN space, may be transmitted prior to transmission of the uplink data packets in part 1 of the PDCP SN space.

In some example embodiments, as depicted in FIG. 4, the PDCP SN space is from 0 to 4095 (a SN may be represented by 12 bit value). The SNs in the part 1 of the PDCP SN space (SN 0 to SN 4079) may be utilized for allocating to the uplink data packets in the uplink buffer. The SNs in the part 2 of the PDCP SN space (SN 4080 to SN 4095) may be exclusively utilized for allocating to the TCP ACK packets in the uplink buffer. Accordingly, part 2 of the PDCP SN space is reserved for allocating to the TCP ACK packets. According to some example embodiments, the UE 100 may be configured to transmit uplink packets with PDCP SNs in the range 4080-4095, prior to transmitting the uplink packets with PDCP SNs in the range 0-4079.

RLC packets may be formed by encapsulating PDCP packets. It is to be noted that the above usage of words 'uplink data packets' and 'TCP ACK packets' refer to 'PDCP PDU including uplink data packets (non TCP ACK packets)' and 'PDCP PDU including TCP ACK packets,' respectively.

Figure 5:
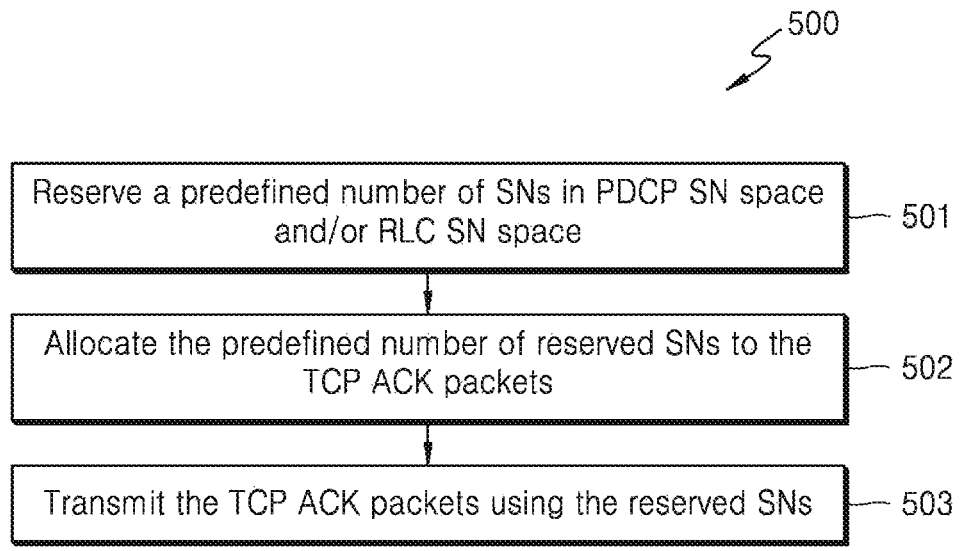
FIG. 5 is a flowchart depicting a method of quick transmission of TCP ACK packets, according to embodiments as disclosed herein.

FIG. 5 depicts segmentation of the PDCP SN space and the RLC SN space for separate allocation of SNs to the TCP ACK packets and the uplink data packets in a 5G network, according to some example embodiments as disclosed herein. The uplink packets constitute uplink data packets and TCP ACK packets. In some example embodiments, the PDCP SN space and the RLC SN space is segmented into parts. A part of the PDCP SN space and the RLC SN space includes a defined number of SNs used for allocating SNs exclusively to TCP ACK packets. Another part of the PDCP SN space and the RLC SN space includes a defined number of SNs used for allocating SNs to the uplink data packets.

In some example embodiments, as depicted in FIG. 5, the PDCP SN space is from 0 to 4095 (a SN may be represented by 12 bit value), wherein the PDCP SN space may be segmented into two parts including part 1 and part 2. The SNs in the part 1 of the PDCP SN space (SN 0 to SN 4079) may be utilized for allocating to the uplink data packets in the uplink buffer. The SNs in the part 2 of the PDCP SN space (SN 4080 to SN 4095) may be exclusively utilized for allocating to the TCP ACK packets in the uplink buffer. Accordingly, the part 2 of the PDCP SN space may be reserved for allocating to the TCP ACK packets. According to some example embodiments, the UE 100 may be configured to transmit uplink packets with a PDCP SN in the range 4080-4095, prior to transmitting the uplink packets with a PDCP SN in the range 0-4079.

In an example, consider that when a first TCP ACK packet arrives in the uplink buffer, some example embodiments include allocating SN 4080 to the first TCP ACK packet. Thereafter if a second TCP ACK packet arrives, then some example embodiments include allocating SN 4081 to the second TCP ACK packet. If all SNs in the range 4080-4095 are used up by the TCP ACK packets, and a TCP ACK packet arrives in the uplink buffer, then the SN allocated to the TCP ACK packet may be 4080. Similarly, if all SNs in the range 0-4079 are used up by uplink data packets, and an uplink data packet arrives in the uplink buffer, then the SN allocated to the uplink data packet may be 0. Accordingly, when allocation of SNs in each part of the PDCP and/or RLC SN reaches a final SN, a subsequent allocation of an SN involves looping around an initial SN in the respective part of the PDCP and/or RLC SN.

In some example embodiments, as depicted in FIG. 5, the RLC SN space is from 0 to 4095 (a SN may be represented by a 12 bit value), wherein the RLC SN space may be segmented into two parts including part 1 and part 2. The SNs in the part 1 of the RLC SN space (SN 0 to SN 4079) may be utilized for allocating to the uplink data packets in the uplink buffer. The SNs in the part 2 of the RLC SN space (SN 4080 to SN 4095) may be utilized for allocating to the TCP ACK packets in the uplink buffer. The part 2 of the RLC SN space may be reserved for allocating to the TCP ACK packets. According to some example embodiments, the UE 100 may be configured to transmit uplink packets with a RLC SN in the range 4080-4095, prior to transmitting the uplink packets with a RLC SN in the range 0-4079.

In some example embodiments, in the 4G network, the PDCP SN space may be segmented into two parts because PDCP packets may be created prior to receiving an uplink grant, whereas the RLC SN space may not be split since RLC packets are created after reception of the uplink grant. In a 5G network (stand alone or non-standalone), the PDCP SN space and the RLC SN space may both be divided into two segments and, as depicted in FIG. 5, the SNs in the PDCP SN space and the RLC SN space may be mapped one to one. The PDCP packets and the RLC packets may be created irrespective of grant reception.

In 5G there may be one to one mapping between the respective segments of PDCP SN space and RLC SN space. The packets belonging to a specific RLC SN segment and a PDCP SN segment may be forwarded to the corresponding segment of the RLC SN segment and the PDCP SN segment of the higher/lower layer.

Segmentation of the PDCP SN space, and segmentation of both the PDCP SN space and the RLC SN space, as discussed in association with some example embodiments, is not limited to a specific type of Radio Access Technology (RAT), e.g., 4G or 5G. Some example embodiments exist which may be utilized in other types of wireless networks and RATs.

In conventional $5^{th}$ Generation/$4^{th}$ Generation (5G/4G) Long-Term Evolution (LTE) networks, due to computational priorities, uplink packets are allocated a PDCP SN and/or RLC SN prior to receiving an uplink grant. If a non NULL security method is configured, then assigning a PDCP SN prior to transmission may mean that either the packet is ciphered using protocol defined rules or it is ciphered at a later time before transmission. The decision to perform the ciphering operation depends on UE implementation and/or Communication Processor (CP) capability because ciphering consumes time and CPU clock. In situations, when ciphering is not performed for the received PDCP Service Data Unit (SDU) (Internet Protocol Packet) contemporaneous for the assigned PDCP SN, there is a flexibility to change the PDCP SN at later point of time. There are also other advantages in the PDCP SN assignment to PDCP SDUs.

Ciphering of uplink PDCP packets is performed, either at an idle time (referred to herein as Non-Real Time (NRT) ciphering) based on UE implementation, or when the UE prepares for transmission of uplink MAC Transport Block (TB), using a RLC protocol data unit (PDU) (RLC Header along with ciphered PDCP PDU) (referred to herein as real time (RT) ciphering). This may be considered RT ciphering because the UE sends the uplink MAC TB in a fixed interval of time T+K' Transmission Time Interval (TTI), wherein T is the TTI when uplink grant is received, and K is the fixed interval of time within which the transmission is performed on allocated resources. With a lower CP hardware capability (e.g., low cost chipset), achieving a higher throughput may incur a higher computational cost. Further, as future Radio Access Technology (RAT) attempts to reduce the K factor, in order to reduce the uplink/downlink transmission time or overall response time, performing the RT ciphering becomes a less desirable design choice.

According to conventional ciphering processes, the PDCP SDU is ciphered using a COUNT value, wherein the COUNT value may be computed using current Hyper Frame Number (HFN) and assigned PDCP SN. As described above, in the New Radio (NR) access technology (5G), due to computational priorities, ciphering for PDCP and RLC PDU is performed in advance. It may be understood that once PDCP SN number is allocated to a packet, it is costly change in the future, as it involves deciphering using the old COUNT value and re-ciphering using new COUNT value.

In Frequency Division Duplex (FDD) LTE, an uplink packet is sent in the Transmission Timer Interval (TTI) 'T+4' after receiving the uplink grant in a TTI at time 'T', wherein one TTI is 1 millisecond. For providing higher throughput, it would be desirable to perform a combination of deciphering using an old COUNT value and re-ciphering using a new COUNT value for packets having an SN that changes due to re-adjustment of the SN. However, this may not be feasible due to an increase in CPU cycle consumption in the Communication Processor (CP), double time resource wastage, and security hardware limitation.

As such, SNs are allocated in order to initiate uplink transmission after receiving the uplink grant to avoid performing a cipher operation on the packet data as mentioned above. This allows achieving higher data rates and better CPU utilization. However, allocation of SNs to the uplink packets prior to receiving an uplink grant involves consumption of SNs at the start of the PDCP SN space and/or the RLC SN space. If there is a bi-directional data transfer, (contemporaneous uplink transmission and downlink reception), then the TCP ACK packets may be allocated to SNs which are later in the PDCP SN space and/or the RLC SN space. Therefore, there may be a delay in the transmission of TCP ACK packets. Delayed TCP ACK transmission may also result in slower TCP window updates. However, as discussed in association with FIGS. 4-5, by reserving SNs at the end of the PDCP SN space and/or the RLC SN space for use in transmitting TCP ACK packets to the server before transmitting uplink data packets, the UE 100 provides a solution to the above described challenges resulting in reduced delay in the transmission of TCP ACK packets.

In conventional methods and systems, deep packet inspection is performed at the CP level and methods are defined to prioritize the TCP ACK packets in order to reduce delay in transmission of ACK packets. However the existing solutions have been found to be focused on a comparatively lower throughput range, targeting readjustment of SNs of the uplink packets and allowing RT ciphering. The existing solutions involve high CPU consumption and their design methods may be undesirable and unscalable to provide a higher throughput range. Hence the conventional methods and systems may not be able to capture provisioning the PDCP and/or RLC SNs by at least one of using a prior security operation, granting scalable and futuristic radio access technology design in a deterministic response time, putting efforts on cipher/decipher operation, and providing guaranteed TCP ACK prioritization; in order to prioritize the TCP ACK packets to reduce delay in transmission of the TCP ACK packets. Accordingly, the conventional methods and systems may not provide a solution to enhance the reliability of the TCP ACK packet transmission for future RATs. However, as discussed in association with FIGS. 4-5, some example embodiments may be implemented using advanced and future RATs such as 4G and 5G. Some example embodiments also provide for increased scalability by allocating an initial SN when a part of the PDCP and/or RLC SN reaches a final SN.

FIG. 5 is a flowchart 500 depicting a method of quick transmission of TCP ACK packets, according to embodiments as disclosed herein. As depicted in step 501, the method includes reserving a predefined number of SNs in the PDCP SN space and/or RLC SN space. The TCP ACK packets can be transmitted using the reserved SNs such that they can be transmitted prior to uplink data packets in the uplink buffer.

At step 502, the method includes allocating the predefined number of reserved SNs, in the PDCP SN space and/or the RLC SN space, to the TCP ACK packets. The reserved SNs, which can be used for allocating to the TCP ACK packets, can be located at the start of the PDCP SN space and/or the RLC SN space.

At step 503, the method includes transmitting the TCP ACK packets using the reserved SNs, in the PDCP SN space and/or the RLC SN space. The TCP ACK packets allocated with SNs at the start of the PDCP SN space and/or the RLC SN space can be transmitted prior to the uplink data packets as the uplink data packets are allocated SNs, which are farther in comparison with the SNs allocated to the TCP ACK packets. The TCP ACK packets can be transmitted prior to the uplink data packets even if the uplink data packets arrive in the uplink buffer prior to arrival of the TCP ACK packets.

The various actions in method 500 may be performed in the order presented, in a different order or simultaneously. Further, in some embodiments, some actions listed in FIG. 5 may be omitted.

Figure 6:
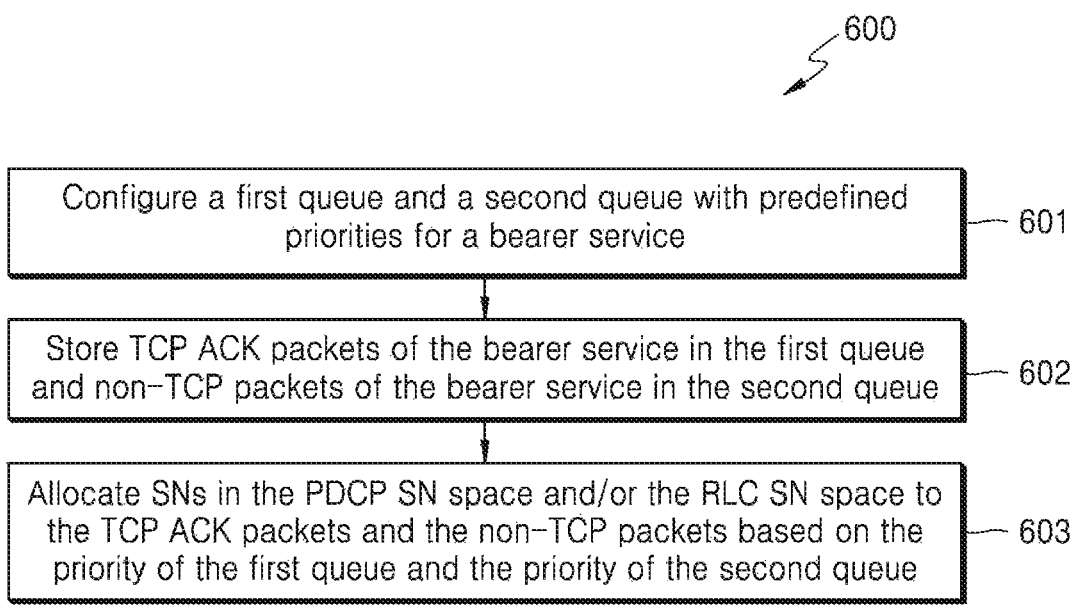
FIG. 6 is a flowchart depicting a method for transmitting TCP ACK packets, according to embodiments as disclosed herein.

FIG. 6 is a flowchart 600 depicting a method for transmitting TCP ACK packets, according to embodiments as disclosed herein. At step 601, the method includes configuring a first queue and a second queue for a bearer service. The first queue and the second queue can have predefined priorities assigned to them. The priority of the first queue can be higher than the priority of the second queue.

At step 602, the method includes storing TCP ACK packets of the bearer service in the first queue and non-TCP packets of the bearer service in the second queue. The first queue can be used for storing TCP ACK packets of the bearer and the second queue can be used for storing non-TCP ACK packets of the bearer.

At step 603, the method includes allocating SNs in the PDCP SN space and/or the RLC SN space to the TCP ACK packets and the non-TCP packets based on the priority of the first queue and the priority of the second queue. The TCP ACK packets in the first queue, with a higher priority, can be allocated with SNs at the start of the PDCP SN space and/or the RLC SN space. The non-TCP packets in the second queue, with a lower priority, can be allocated with SNs in the PDCP SN space and/or the RLC SN space, which are farther in comparison with the SNs allocated to the TCP ACK packets. As such, the TCP ACK packets can be transmitted prior to the non-TCP packets even if the non-TCP packets arrive in the uplink buffer prior to arrival of the TCP ACK packets.

It can be noted that each bearer can have its individual first and second queues. For the sake of presentation, the method is described using a single bearer.

The various actions in method 600 may be performed in the order presented, in a different order or simultaneously. Further, in some embodiments, some actions listed in FIG. 6 may be omitted.

Figure 7:
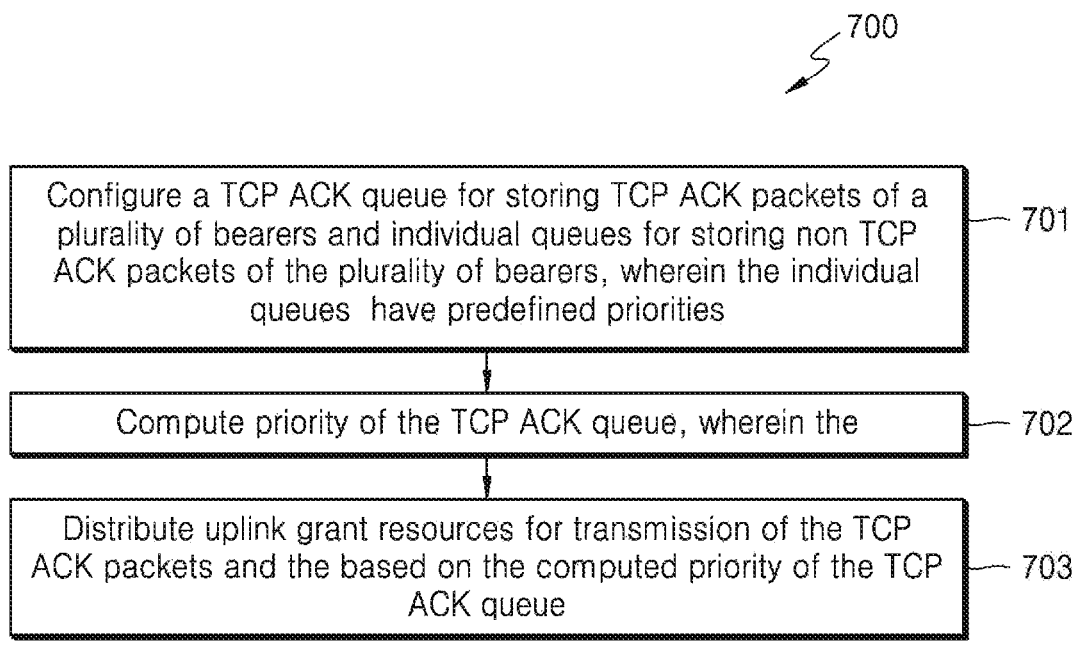
FIG. 7 is a flowchart depicting another method for transmitting TCP ACK packets, according to embodiments as disclosed herein.

FIG. 7 is a flowchart 700 depicting another method for transmitting TCP ACK packets, according to embodiments as disclosed herein. At step 701, the method includes configuring a TCP ACK queue for storing TCP ACK packets of a plurality of bearers. Each of the bearers can have individual queues for storing uplink data packets of the respective bearers. The individual queues of each of the plurality of bearer services can have a predetermined priority.

At step 702, the method includes computing priority of the TCP ACK queue. In an embodiment, the priority of the TCP ACK queue, storing the TCP ACK packets of the plurality of bearers, can be computed based on an average of the predetermined priorities of the individual queues of each of the bearers. In another embodiment, the priority of the TCP ACK queue can be computed based on the number of TCP ACK packets of each of the plurality of bearer services and the predetermined priorities of the individual queues of each of the plurality of bearers.

At step 703, the method includes distributing uplink grant resources for transmission of the TCP ACK packets and the non-TCP packets, based on the computed priority of the TCP ACK queue and predetermined priorities of the individual queues of each of the plurality of bearer services respectively.

The various actions in method 700 may be performed in the order presented, in a different order or simultaneously. Further, in some embodiments, some actions listed in FIG. 7 may be omitted Some example embodiments disclosed herein may be implemented through at least one software program running on at least one hardware device and performing network management functions to control the network elements. The network elements shown in FIGS. 1a and 1b include blocks which may be at least one of a hardware device, or a combination of hardware device and software module.

Some example embodiments disclosed herein describe methods and systems. It is understood that the scope of the protection is extended to a program and in addition to a computer readable means having a message therein, such computer readable storage means contain program code means for implementation of one or more operations of the method, when the program runs on a server or mobile device or any suitable programmable device. The method is implemented in some example embodiments through or together with a software program written in, e.g., Very high speed integrated circuit Hardware Description Language (VHDL), another programming language, or implemented by one or more VHDL or several software modules being executed on at least one hardware device. The hardware device may be any kind of portable device that may be programmed. The device may also include means which could be e.g. hardware means like, e.g., an ASIC, or a combination of hardware and software means, e.g., an ASIC and an FPGA, or at least one microprocessor and at least one memory with software modules located therein. Some example embodiments described herein could be implemented partly in hardware and partly in software. Alternatively, some example embodiments may be implemented on different hardware devices, e.g., using a plurality of CPUs.

The foregoing description of some example embodiments will so fully reveal the general nature of some example embodiments herein that others can, by applying current knowledge, readily modify and/or adapt for various applications some example embodiments without departing from the generic concepts, and, therefore, such adaptations and modifications should and are intended to be comprehended within the meaning and range of equivalents of some example embodiments. It is to be understood that the phraseology or terminology employed herein is for the purpose of description and not of limitation. Therefore, while some example embodiments herein have been described, those skilled in the art will recognize that some example embodiments herein can be practiced with modification within the spirit and scope of some example embodiments as described herein.

What is claimed is:

1. A method performed by a User Equipment (UE) for transmission of a plurality of Transport Control Protocol (TCP) Acknowledgement (ACK) packets of a plurality of bearer services, the method comprising:
   reserving a plurality of Sequence Numbers (SNs) in at least one of a Packet Data Convergence Protocol (PDCP) SN space or a Radio Link Control (RLC) SN space;
   ordering the plurality of TCP ACK packets in one or more first queues and a plurality of non-TCP ACK packets of the plurality of bearer services in a plurality of second queues;

allocating the plurality of reserved SNs to the plurality of TCP ACK packets and a plurality of non-reserved SNs to the plurality of non-TCP ACK packets based on the one or more first queues and the plurality of second queues; and sending the plurality of TCP ACK packets.

2. The method, as claimed in claim 1, wherein a number of the plurality of reserved SNs is static.

3. The method, as claimed in claim 1, wherein a number of the plurality of reserved SNs is dynamic.

4. The method, as claimed in claim 3, wherein the reserving reserves the number of the plurality of reserved SNs based on at least one of an uplink data rate, a downlink data rate, a Block Error Rate (BLER), a Bit Error Rate (BER), a signal quality, a network load, or a number of unutilized SNs among the plurality of reserved SNs.

5. The method, as claimed in claim 4, further comprising:
allocating unutilized SNs among the plurality of reserved SNs to at least one of a previous PDCP Service Data Unit (SDU), a subsequent PDCP data SDU, or a PDCP SDU header.

6. The method, as claimed in claim 1, wherein the reserving reserves the plurality of SNs by:
segmenting the at least one of the PDCP SN space or the RLC SN space into a first region and a second region, the first region including a first plurality of SNs and the second region including a second plurality of SNs; and
reserving the plurality of SNs among the second plurality of SNs included in the second region.

7. The method, as claimed in claim 6, further comprising:
allocating the first plurality of SNs included in the first region to one or more of the plurality of non-TCP ACK packets.

8. The method, as claimed in claim 1, wherein
the one or more first queues comprise only a single first queue; and
the method further comprises
calculating a priority of the first queue based on an average of a plurality of determined priorities of the plurality of second queues, each of the plurality of second queues including one or more uplink data packets of one of the plurality of bearer services and having a determined priority among the plurality of determined priorities, and
allocating uplink grant resources for transmission of the plurality of TCP ACK packets based on the calculated priority of the first queue and the plurality of determined priorities of the plurality of second queues.

9. The method, as claimed in claim 1, wherein
the one or more first queues comprise only a single first queue; and
the method further comprises
calculating a priority of the first queue based on a number of the plurality of TCP ACK packets associated with each of the plurality of second queues and a plurality of determined priorities of the plurality of second queues, each of the plurality of second queues including one or more uplink data packets of one of the plurality of bearer services and having a determined priority among the plurality of determined priorities, and
allocating uplink grant resources for transmission of the plurality of TCP ACK packets based on the calculated priority of the first queue and the plurality of determined priorities of the plurality of second queues.

10. The method, as claimed in claim 1, further comprising: transmitting the plurality of TCP ACK packets through at least one of NSA (Non Standalone) NR (New Radio) including a License Assisted Access (LAA) link,
a Device to Device (D2D) peer,
a first carrier of a first plurality of carriers for which a grant is available for at least one of Carrier Aggregation (CA) or Dual Connectivity (DC), the first carrier having a lowest Block Error Rate (BLER) of the first plurality of carriers and a highest Signal to Interference and Noise Ratio (SINR) of the first plurality of carriers,
a second carrier of a second plurality of carriers for which the grant is available, the second carrier having a highest Power Headroom (PH) of the second plurality of carriers, or
a primary carrier and a secondary carrier for NSA NR.

11. The method, as claimed in claim 1, wherein:
the reserving reserves the plurality of SNs in a portion of the PDCP SN space; and
the sending sends the plurality of TCP ACK packets over a 4th Generation (4G) Long-Term Evolution (LTE) network.

12. The method, as claimed in claim 1, wherein:
the reserving reserves the plurality of SNs in both a portion of the PDCP SN space and a portion of the RLC SN space, the PDCP SN space having a one-to-one mapping with the RLC SN space;
the allocating allocates the plurality of reserved SNs to the plurality of TCP ACK packets such that each of the plurality of TCP ACK packets is allocated a first SN of the portion of the PDCP SN space and a corresponding second SN of the RLC SN space; and
the sending sends the plurality of TCP ACK packets over a 5th Generation (5G) LTE network.

13. A method performed by a User Equipment (UE) for transmission of a plurality of Transport Control Protocol (TCP) Acknowledgement (ACK) packets of a plurality of bearer services, the method comprising:
ordering the plurality of TCP ACK packets in one or more first queues and a plurality of non-TCP ACK packets of the plurality of bearer services in a plurality of second queues, the one or more first queues having a higher priority than at least one of the plurality of second queues; and
allocating a plurality of Sequence Numbers (SN) in at least one of a Packet Data Convergence Protocol (PDCP) SN space or a Radio Link Control (RLC) SN space to the plurality of TCP ACK packets and the plurality of non-TCP ACK packets based on the priorities of the one or more first queues and the plurality of second queues.

14. A User Equipment (UE) for transmission for a plurality of Transport Control Protocol (TCP) Acknowledgement (ACK) packets of a plurality of bearer services, the UE comprising:
a memory storing computer-readable instructions; and
at least one processor coupled to the memory and configured to execute the computer-readable instructions to
reserve a plurality of SNs in at least one of a Packet Data Convergence Protocol (PDCP) SN space or a Radio Link Control (RLC) SN space,
order the plurality of TCP ACK packets in one or more first queues and a plurality of non-TCP ACK packets of the plurality of bearer services in a plurality of second queues,
allocate the plurality of reserved SNs to the plurality of TCP ACK packets and a plurality of non-reserved SNs to the plurality of non-TCP ACK packets based on the one or more first queues and the plurality of second queues, and send the plurality of TCP ACK packets.

15. The UE, as claimed in claim 14, wherein a number of the plurality of reserved SNs is static.

16. The UE, as claimed in claim 14, wherein a number of the plurality of reserved SNs is dynamic.

17. The UE, as claimed in claim 16, wherein the at least one processor is configured to execute the computer-readable instructions to reserve the number of the plurality of reserved SNs based on at least one of an uplink data rate, a downlink data rate, a Block Error Rate (BLER), a Bit Error Rate (BER), a signal quality, a network load, or a number of unutilized SNs among the plurality of reserved SNs.

18. The UE, as claimed in claim 17, wherein the at least one processor is configured to execute the computer-readable instructions to allocate unutilized SNs among the plurality of reserved SNs, to at least one of one of a previous PDCP Service Data Unit (SDU), a subsequent PDCP data SDU, or a PDCP SDU header.

19. The UE, as claimed in claim 14, wherein the at least one processor is configured to execute the computer-readable instructions to reserve the plurality of SNs by:

segmenting the at least one of the PDCP SN space or the RLC SN space into a first region and a second region, the first region including a first plurality of SNs and the second region including a second plurality of SNs; and reserving the plurality of SNs among the second plurality of SNs included in the second region.

20. The UE, as claimed in claim 19, wherein the at least one processor is configured to execute the computer-readable instructions to allocate the first plurality of SNs included in the first region to one or more of the plurality of non-TCP ACK packets.

* * * * *